(12) United States Patent
Bieg et al.

(10) Patent No.: US 7,887,095 B2
(45) Date of Patent: Feb. 15, 2011

(54) BELT TENSIONER FOR A SEATBELT SYSTEM

(75) Inventors: Wilfried Bieg, Eschach (DE); Michael Vogeltanz, Winnenden (DE); Wolf-Dieter Hönl, Bobingen (DE); Thomas Mödinger, Alfdorf (DE); Tanja Rau, Schwabisch Gmund (DE)

(73) Assignee: TRW Automotive GmbH, Alfdorf (DE)

( * ) Notice: Subject to any disclaimer, the term of this patent is extended or adjusted under 35 U.S.C. 154(b) by 63 days.

(21) Appl. No.: 12/086,671

(22) PCT Filed: Dec. 12, 2006

(86) PCT No.: PCT/EP2006/011957

§ 371 (c)(1),
(2), (4) Date: Jan. 15, 2009

(87) PCT Pub. No.: WO2007/068452

PCT Pub. Date: Jun. 21, 2007

(65) Prior Publication Data

US 2009/0261567 A1    Oct. 22, 2009

(30) Foreign Application Priority Data

Dec. 13, 2005  (DE) .................. 10 2005 059 568
Mar. 24, 2006  (DE) .................. 20 2006 004 748 U (51) Int. Cl.
   *B60R 22/36*    (2006.01)
(52) U.S. Cl. ..................................... 280/806
(58) Field of Classification Search ............... 280/806, 280/807; 297/474–480
   See application file for complete search history.

(56) References Cited

U.S. PATENT DOCUMENTS

| 5,190,239 | A | * | 3/1993 | Yoshida et al. | ............... 242/374 |
| 5,383,623 | A | * | 1/1995 | Hiruta et al. | ................. 242/374 |
| 5,505,399 | A | * | 4/1996 | Schmid et al. | ............... 242/374 |
| 5,641,131 | A | * | 6/1997 | Schmid et al. | ............... 242/374 |
| 5,782,423 | A | * | 7/1998 | Miller et al. | ................. 242/374 |

FOREIGN PATENT DOCUMENTS

| DE | 94 05 834.2 U1 | 10/1994 |
| DE | 196 02 549 A1 | 8/1996 |
| DE | 103 42 283 A1 | 4/2005 |
| EP | 0 628 454 A1 | 12/1994 |
| GB | 2 323 016 A | 9/1998 |
| JP | 2000-142319 A | 5/2000 |
| WO | WO 97/13660 A1 | 4/1997 |
| WO | WO 03/082640 A1 | 10/2003 |

* cited by examiner

*Primary Examiner*—Faye M. Fleming
(74) *Attorney, Agent, or Firm*—Tarolli, Sundheim, Covell & Tummino LLP

(57) ABSTRACT

A belt tensioner for a safety belt system includes a pinion (16) rotatably mounted in a housing (12), a drive unit (26), and a toothed rack (18) whose toothing (20) is directly engaged or enters into direct engagement with the pinion (16) and which can be driven by means of the drive unit (26). The toothed rack (18) has the shape of a circular arc and moves on a circular path (K) upon activation of the drive unit (26).

23 Claims, 12 Drawing Sheets

BELT TENSIONER FOR A SEATBELT SYSTEM

FIELD OF THE INVENTION

The invention relates to a belt tensioner for a safety belt system, including a pinion rotatably mounted in a housing, a drive unit, and a toothed rack whose toothing is directly engaged or comes into direct engagement with the pinion and which can be driven by means of the drive unit, the toothed rack having the shape of a circular arc and, upon activation of the drive unit, moving on a circular path the central point of which is offset from the axis of rotation of the pinion.

BACKGROUND OF THE INVENTION

A generic belt tensioner is disclosed in DE 94 05 834 U1 or U.S. Pat. No. 5,782,423 A, for example. Both documents describe a belt tensioner in which a pyrotechnically drive generates a compressed gas which applies pressure on a curved toothed rack which is in engagement with a pinion.

GB 2 323 016 A discloses a belt tensioner in which a sector gearwheel driving a pinion is driven by mass bodies acted upon with pressure, which are in the form of balls.

WO 03/082640 A1 likewise describes a so-called ball tensioner in which in a case of activation a pyrotechnical drive drives the balls into recesses of a drive wheel and thereby causes the drive wheel to rotate.

EP 0 628 454 A1 discloses a belt tensioner in which a ring gear of a planetary gearing is provided as the drive element and is coupled to a sun wheel via a plurality of planet wheels. The sun wheel, in turn, is adapted to be coupled to a belt reel. The ring gear includes a wing extension which is mounted in an annular channel surrounding the ring gear. Communicating with the channel is a gas generator which upon actuation generates compressed gas which applies pressure on the wing extension and thereby drives the ring gear.

From DE 103 42 283 A1 a belt tensioner is known in which as a drive unit a pyrotechnical propellant charge is provided. This propellant charge generates a compressed gas which acts upon the piston of a piston/cylinder unit that is guided in the cylinder so as to be longitudinally displaceable. The piston is coupled to a toothed rack which drives the shaft of a belt retractor via a pinion, in order to retract a slack in the belt webbing in a restraint case.

SUMMARY OF THE INVENTION

In contrast, the invention provides a belt tensioner which is distinguished by a high tensioning efficiency, the construction at the same time being particularly compact.

In accordance with the invention this is achieved in a belt tensioner of the aforementioned kind in that the toothed rack includes an engagement element for the drive unit, the engagement element having a larger radial distance from the central point of the circular path than the toothing. Thus, since the drive force acting on the engagement element disposes of a longer lever arm than the force transmitted to the pinion by the toothing, a comparatively small drive force at the engagement element suffices to rotate the pinion on account of the torque conservation, which is why the component stress on the driving element is significantly lower as compared to known systems. In this connection, circular arc in particular also denotes a full circle which, in fact, represents a circular arc having a central angle of 360°. By means of the design in accordance with the invention, in particular the overall length of the belt tensioner may significantly be reduced and the tensioning length may considerably be increased as compared to the linear toothed rack known from the prior art which moves on a linear path. Of course, instead of a toothed rack in the shape of a circular arc, a toothed rack which is curved differently and moves on a curved path, for example an oval, could also be used. Then, the toothed rack would, however, have to be configured flexibly (on account of the non-constant radius of curvature).

In addition, the central point of the circular path is offset from the axis of rotation of the pinion. In this manner also in the case of a comparatively large radius of the circular path a direct engagement of the toothed rack with the pinion may be implemented, so that further gears for the transmission of forces may be dispensed with.

To increase the stability, it is possible to provide a rotary vane via which the toothed rack is rotatably mounted on the housing in the central point of the circular path.

In order to ensure a particularly rapid response of the belt tensioner, the drive unit advantageously comprises a pyrotechnical drive. As an alternative, an electric or mechanical drive could, however, also be used.

The engagement element may be configured as a pressure surface and disposed in a pressure chamber which at least partly surrounds the circular path.

Preferably, the drive unit includes a force transmission element which is non-positively or directly coupled to the engagement element and acts upon the latter with the drive force upon activation of the drive unit.

In particular, the force transmission element is integrally formed with the engagement element.

The force transmission element may be a tubular sleeve. This sleeve may for example be pressurized by the compressed gas generated by a pyrotechnical drive and may thereby be moved along the circular path. For this purpose the sleeve should likewise have the shape of a circular arc or be flexibly designed.

As an alternative, the force transmission element may be a piston which is again designed in particular in the shape of a circular arc and disposed in the interior of a cylinder in the shape of a circular arc.

Of course, the force transmission element may also comprise a plurality of balls, one of which directly engages the engagement element.

According to a further embodiment of the invention it is provided for that the pressure chamber has a coating that serves as a sealing arrangement. By means of such a coating in particular a pressure chamber which is rectangular in cross-section and in which an engagement element that is likewise rectangular in a top view is disposed may be considerably better sealed than if a sealing were provided on the engagement element.

In order to achieve a particularly good sealing effect, it is advantageous if the engagement element partly penetrates into the coating. There is thus an oversize of the individual components, whereby the sealing coating is compressed and possible sealing gaps of the individual components in relation to each other are closed.

In order to facilitate the penetration of the engagement element into the coating, the engagement element advantageously includes at least one chamfered edge on the side facing away from the drive unit.

Provided in a further embodiment of the invention is a locking wedge which upon activation of the drive unit comes into engagement with the pinion and subsequently prevents the same from rotating against the tensioning direction. By means of this design an unwinding of the belt webbing is effectively prevented already immediately after termination of the belt tensioning, since the locking wedge already comes into engagement with the pinion whilst the tensioning movement still continues. Thus, the locking wedge is in a kind of waiting position which prevents any undesired unwinding of the belt webbing after termination of the tensioning movement.

At the start of the tensioning movement the locking wedge may be releasably coupled to the toothed rack. When the toothed rack is moved by the drive unit, the locking wedge also moves in the tensioning direction towards the pinion.

Preferably, at the start of the tensioning movement the locking wedge is guided along a housing-fixed guide.

According to one design the locking wedge includes at least one tooth which at the start of the tensioning movement engages with the toothing of the toothed rack and in this manner implements the (releasable) connection to the toothed rack.

To ensure that the locking wedge is moved out of engagement with the toothed rack at the appropriate time, the locking wedge may include a prestressed spring which supports on the toothed rack. If the design of the housing-fixed guide permits, the locking wedge is thus released from the toothing of the toothed rack.

According to an alternative embodiment, the locking wedge is coupled to the toothed rack via an intermediate member at the start of the tensioning movement. This intermediate member jointly moves with the toothed rack at least at the start of the tensioning movement.

The locking wedge may again include a prestressed spring which in this embodiment supports on the intermediate member and at the appropriate moment provides for a releasing of the locking wedge from the intermediate member.

In a further design of the invention, it is provided for that the toothed rack includes a section without toothing which is disposed in the region of the pinion prior to the activation of the drive unit. This is advantageous especially if the toothed rack has the shape of a full circle, hence is designed in particular as a ring gear. On account of the absent toothing it is ensured that the pinion is able to move freely during the normal retraction operation. When the belt tensioner is activated, the toothed rack rotates relative to the pinion, whereby after a certain angular rotation the toothing of the toothed rack comes into engagement with the pinion. In this manner a mechanical coupling and the assembly thereof may be dispensed with, which results in a cost benefit. Moreover, the design described is distinguished by a relatively small slip, which results in a lower power loss of the total system and a reduced stress on the occupant. In the case of a toothed rack which has the shape of a partial circular arc, the toothed rack may as an alternative be disposed such that prior to the activation of the belt tensioner it is not yet engaged with the pinion.

In a further embodiment of the invention, it is provided for that for sealing the pressure chamber the toothed rack and the housing have a sealing disposed therebetween whose sealing effect increases as the pressure rises. In this manner a sealing gap between the toothed rack and the housing of the belt tensioner is optimally sealed, in particular also during the tensioning process in which the toothed rack executes a rotary movement.

The desired sealing effect may be achieved by the sealing including an engagement surface for the gas pressure, the engagement surface lying opposite to a gap to be sealed. Thus, the force which acts upon the sealing towards the gap to be sealed increases as the gas pressure rises. This design is distinguished by its simple assembly and cost-effective manufacture.

It is further advantageous if the housing includes a protrusion by which the sealing is held. On the one hand, this protrusion prevents the sealing from shifting; on the other hand, it serves for the systematic guidance of the gas pressure onto the engagement surface of the sealing.

BRIEF DESCRIPTION OF THE DRAWINGS

Further features and advantages of the invention will be apparent from the following description of several preferred embodiments with reference to the accompanying drawings, in which.

DESCRIPTION OF THE EXAMPLE EMBODIMENTS

Figure 1:
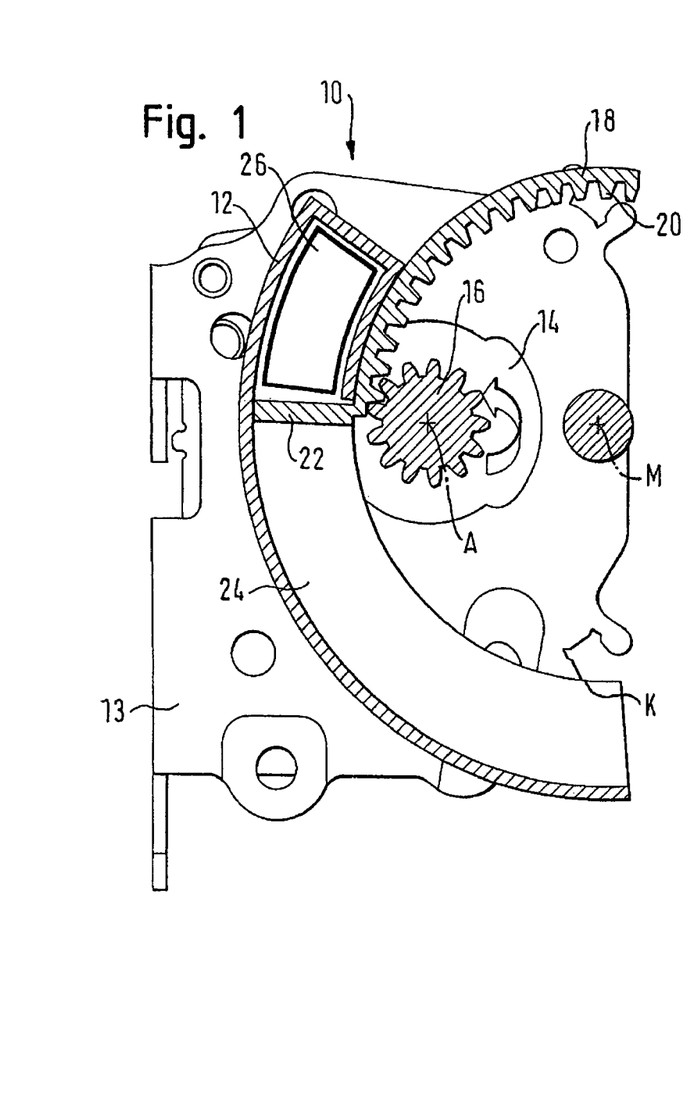
FIG. 1 shows a schematic sectional view of a belt tensioner according to a first embodiment of the invention in the state of installation prior to an activation.

FIG. 1 shows a belt tensioner 10 according to a first embodiment of the invention. The belt tensioner 10 includes a housing 12 which is connected to the retractor housing 13 of a belt retractor, in particular integrally formed therewith. Rotatably mounted in a depression 14 in the interior of the housing 12 is a pinion 16 which in a restraint case is couplable to the shaft of the belt retractor. The axis of rotation of the pinion 16 is designated A.

Moreover, the belt tensioner 10 includes a toothed rack 18 whose toothing 20 meshes with the pinion 16. The toothed rack 18 has the shape of a circular arc, in this arrangement a quarter circular arc, and may move on a circular path K about the central point M, in order to drive the pinion 16. The toothed rack 18 includes an engagement element 22, here a vane which radially points outwards as seen from the central point M and which is disposed in a partially ring-shaped recess 24 in the housing 12. The engagement element 22 thus has a larger radial distance from the central point M of the circular path K than the toothing 20. Likewise disposed in the recess 24 which extends directly radially outside the circular path K is a drive unit 26 which is only outlined in FIG. 1 and acts upon the engagement element 22 on activation.

As is apparent from FIG. 1, the central point M of the circular path K does not coincide with the axis of rotation A of the pinion 16.

Figure 3:
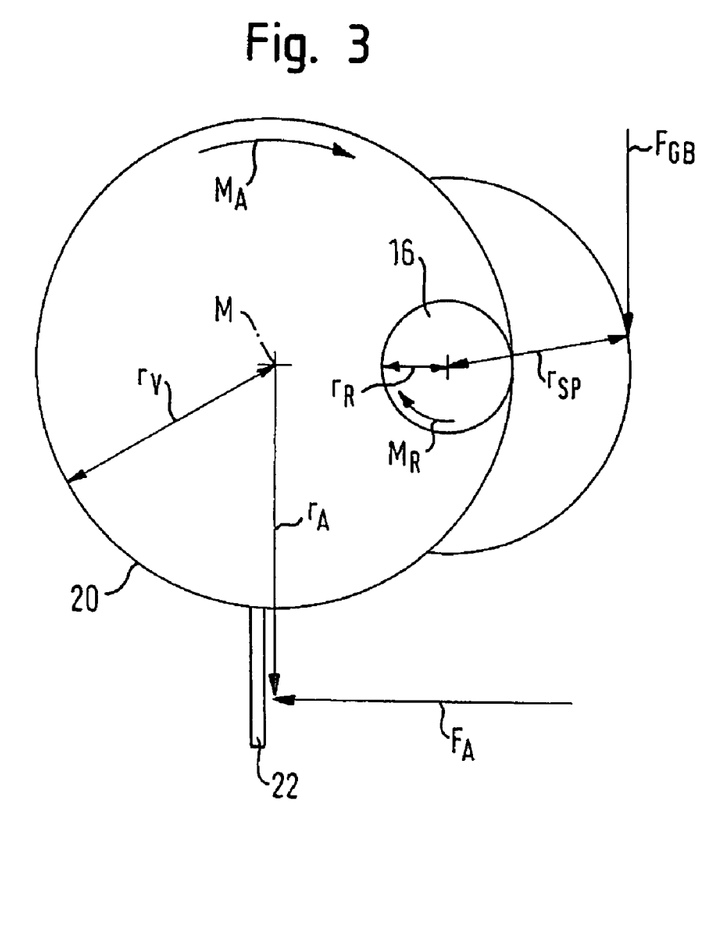
FIG. 3 shows a schematic representation of the forces and torques occurring in the belt tensioner of FIG. 1.

In the normal vehicle operation, the belt tensioner 10 is not connected to the shaft of the belt retractor. In a restraint case the pinion 16 is coupled to the belt retractor shaft, and simultaneously or even earlier the drive unit 26 is activated, which may be an electric, mechanical, or pyrotechnical unit. The drive unit 26 drives the toothed rack 18 in FIG. 1 counterclockwise (see FIG. 2) by acting with a drive force $F_A$ upon the engagement element 22 which is able to move in the recess 24 in the housing (cf. FIG. 3). Thereby, a torque $M_A$ of the toothed rack 18 relative to the central point M is generated, this torque $M_A$ being equal to the product of the drive force $F_A$ and the drive radius $r_A$ (the distance of the point of application of the force $F_A$ on the engagement element 22 from the central point M of the circular path). Since the drive radius $r_A$ is larger than the radius $r_V$ of the toothing 20, it is possible by means of a relatively small force $F_A$ to generate a torque $M_A$ which may be led off at the pinion 16 as a comparatively large force $F_R$. The force $F_R$ in turn generates at the pinion 16 a torque $M_R$ which corresponds to the effective retractor torque and causes a belt webbing force $F_{GB}$ at a belt reel having the radius $r_{Sp}$. The following applies here to the force $F_R$ acting on the pinion 16:

$$F_R = \frac{M_A}{r_V} = \frac{r_A}{r_V} \cdot F_A$$

In the ideal case the belt webbing force is calculated as follows:

$$F_{GB} = \frac{M_R}{r_{Sp}} = \frac{r_R}{r_{Sp}} \cdot F_R = \frac{r_R \cdot r_A}{r_{Sp} \cdot r_V} \cdot F_A,$$

where $r_R$ denotes the radius of the pinion 16.

Figure 4:
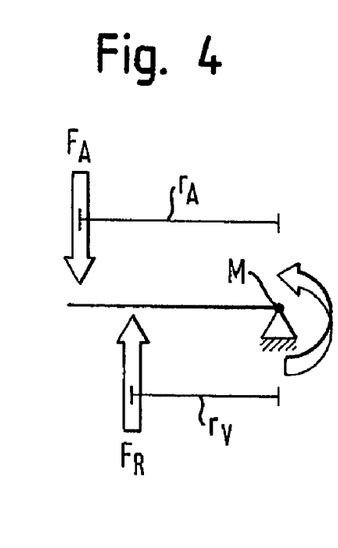
FIG. 4 shows a sketch of the forces engaging the toothed rack.

In FIG. 4, the lever ratio at the toothed rack 18 is again shown more clearly. On account of the larger lever arm $r_A$ the drive force $F_A$ is translated into a larger force $F_R$ which is exerted by the toothing 20 on the pinion 16.

Figure 5:
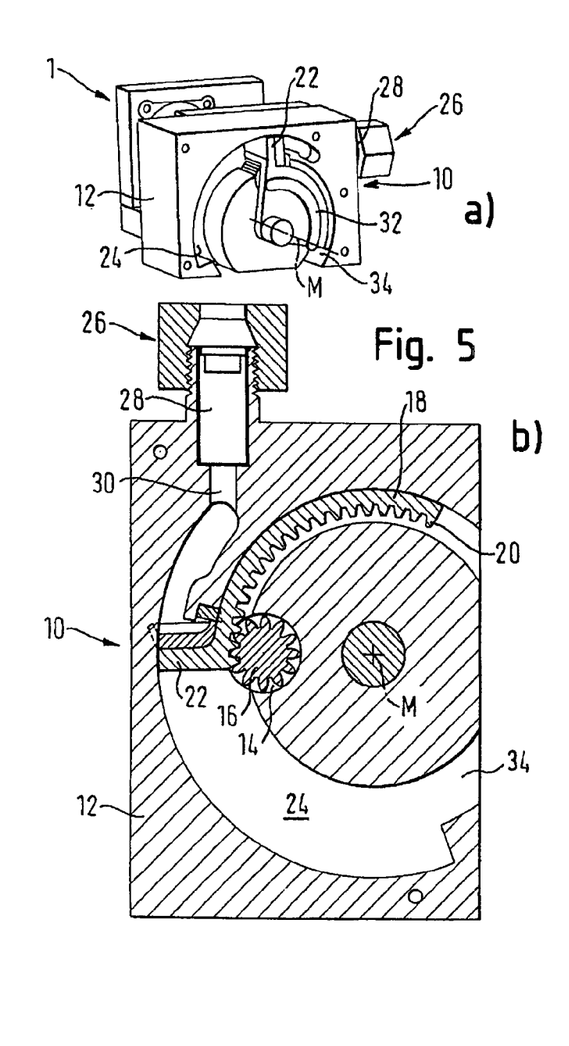
FIG. 5 shows a second embodiment of a belt tensioner according to the invention in the state of installation in a perspective view (a) and in a sectional view (b)

FIG. 5 shows a belt tensioner 10 according to a second embodiment of the invention, with identical components or components which have the same function bearing the same reference numerals and hereinafter only the differences to the first embodiment being discussed.

In the belt tensioner 10 according to FIG. 5 the drive unit 26 comprises a pyrotechnical drive 28 which communicates via a bore 30 in the housing 12 with the recess 24. The toothed rack 18, which is rotatably mounted on the housing in the central point M of the circular path K via a rotary vane 32, is disposed in the interior of a channel 34 which has the shape of a partial circular ring. In the region of the recess 24 for the engagement element 22 the channel 34 directly passes into the recess 24. The recess 24 is designed as a pressure chamber, and the engagement element 22 includes a pressure surface.

In the restraint case the pyrotechnical drive 28 is activated and generates a compressed gas which flows through the bore 30 into the recess 24 designed as a pressure chamber and thereby acts upon the engagement element 22 with pressure. Thereby, the toothed rack 18 is caused to make a counterclockwise rotary movement which in turn drives the pinion 16 (FIG. 6).

Figure 6:
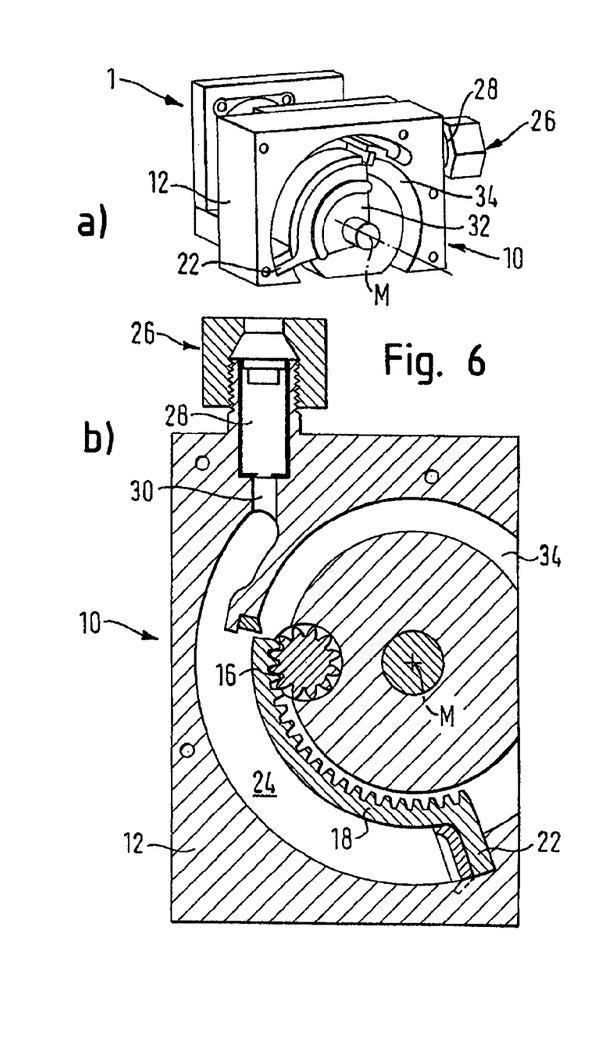
FIG. 6 shows the belt tensioner of FIG. 5 after a tensioning action, again in a perspective view (a) and in a sectional view (b)
Figure 7:
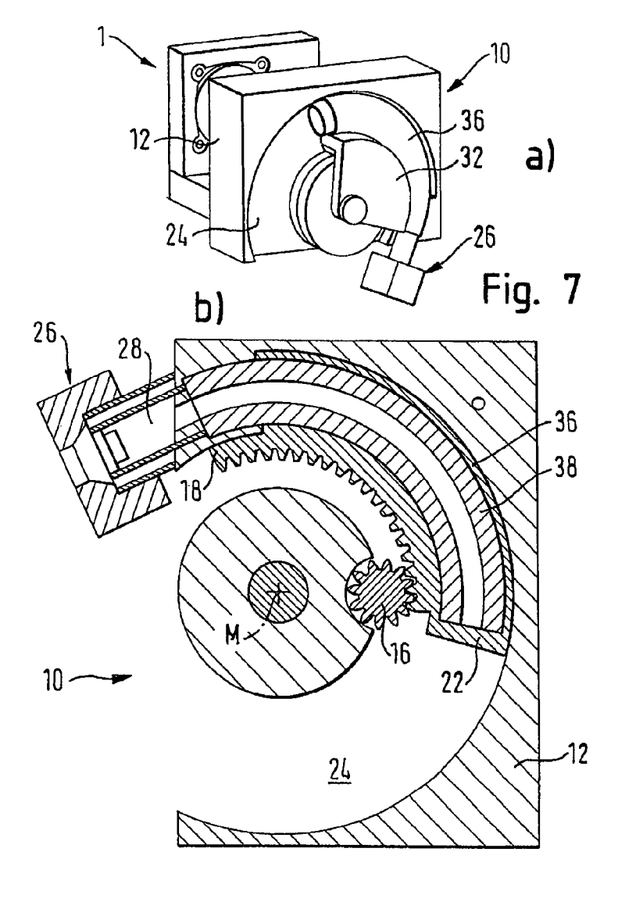
FIG. 7 shows a belt tensioner according to a third embodiment of the invention in the state of installation in a perspective view (a) and in a sectional view (b)
Figure 8:
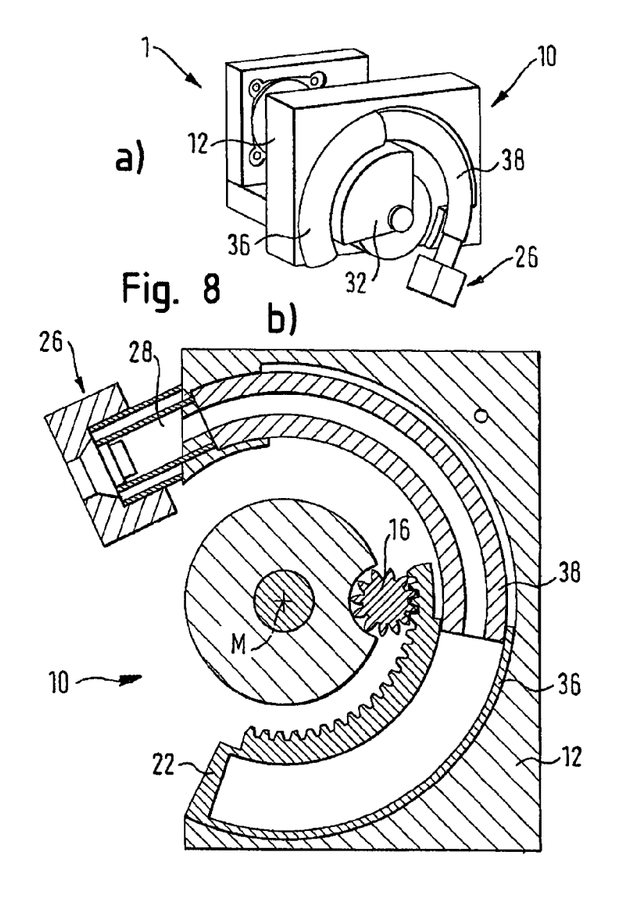
FIG. 8 shows the belt tensioner of FIG. 7 after a tensioning action, again in a perspective view (a) and in a sectional view (b)

FIGS. 7 and 8 show a belt tensioner according to a third embodiment of the invention, this belt tensioner solely differing from the embodiment of FIGS. 5 and 6 by the provision of a force transmission element in the form of a tubular sleeve 36 which is integrally formed in this arrangement with the engagement element 22 and the toothed rack 18. Like the toothed rack 18, the sleeve 36 has the shape of a circular arc and is guided in the non-activated state of the belt tensioner 10 via a tube 38 which likewise has the shape of a circular arc. The tube 38 which, just like the sleeve 36, is disposed in the interior of the recess 24 designed as a pressure chamber serves to guide the sleeve 36 which moves clockwise (FIG. 7b) upon an application of pressure on the engagement element 22, and thereby drives the pinion 16.

Figure 9:
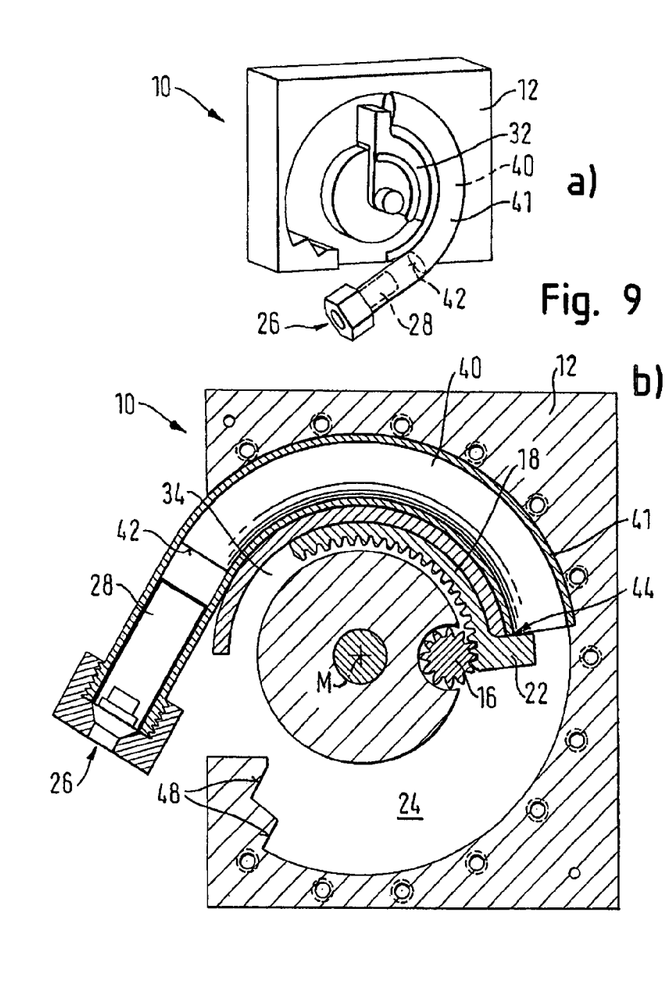
FIG. 9 shows a belt tensioner according to a fourth embodiment of the invention in the state of installation in a perspective view (a) and in a sectional view (b)
Figure 10:
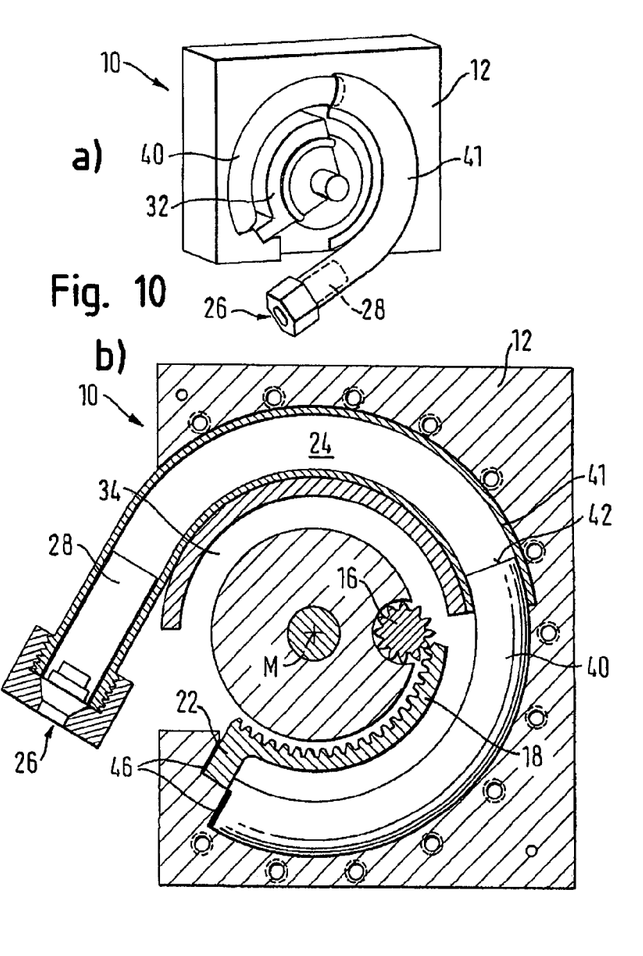
FIG. 10 shows the belt tensioner of FIG. 9 after a tensioning action, again in a perspective view (a) and in a sectional view (b)

Provided in the fourth embodiment of the belt tensioner 10 according to FIGS. 9 and 10 as a force transmission element is an arcuate piston 40 which is guided in a cylinder sleeve 41 that is likewise curved in the shape of a circular arc. The piston 40 is acted upon with compressed gas by the pyrotechnical drive 28 at its end 42 facing the drive and by means of the non-positive coupling with the engagement element 22 drives the toothed rack 18 and thus also the pinion 16 clockwise (FIG. 10b). As an option, it is possible to provide a starting damping 44 between the piston 40 and the engagement element 22, and an end position damping 46 on the stop 48 at the end of the channel 34 or the recess 24.

Figure 11:
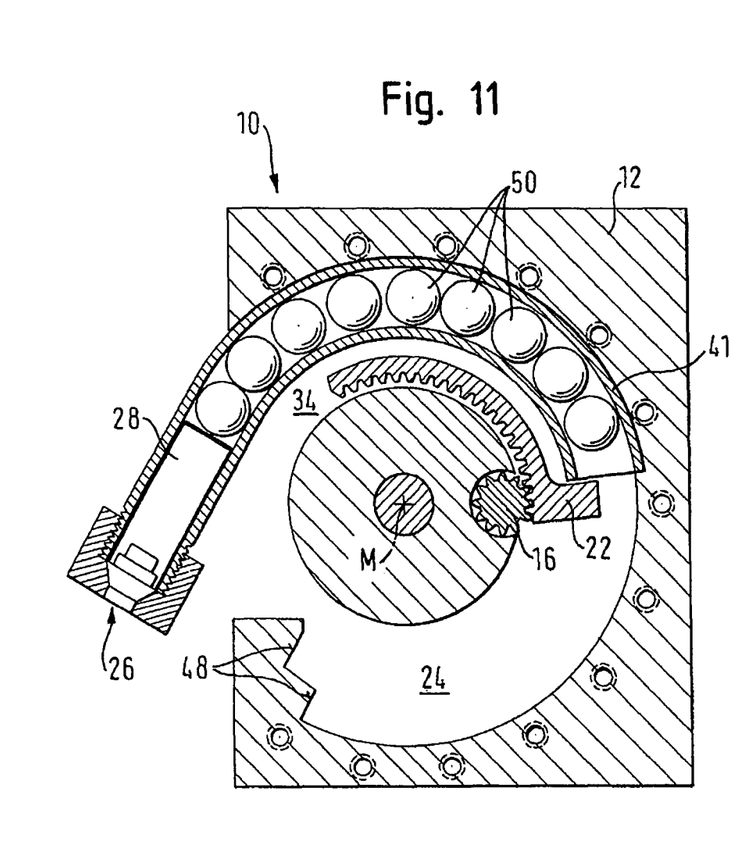
FIG. 11 shows a sectional view of a belt tensioner according to a fifth embodiment of the invention in the state of installation.
Figure 12:
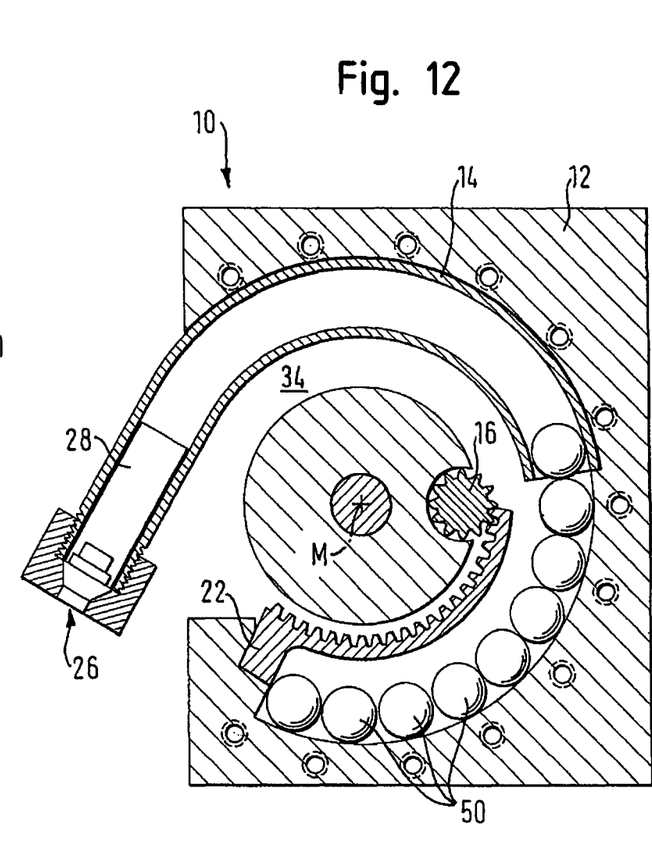
FIG. 12 shows a sectional view of the belt tensioner of FIG. 11 after a tensioning action.

FIGS. 11 and 12 show a fifth embodiment of the invention which is very similar to that of FIGS. 9 and 10. The belt tensioner 10 according to FIGS. 11 and 12 includes as a force transmission element a plurality of balls 50 which are acted upon with the compressed gas generated by the pyrotechnical drive 28 and clockwise drive the toothed rack 18 and thus the pinion 16 via the non-positive coupling with the engagement element 22.

Figure 13:
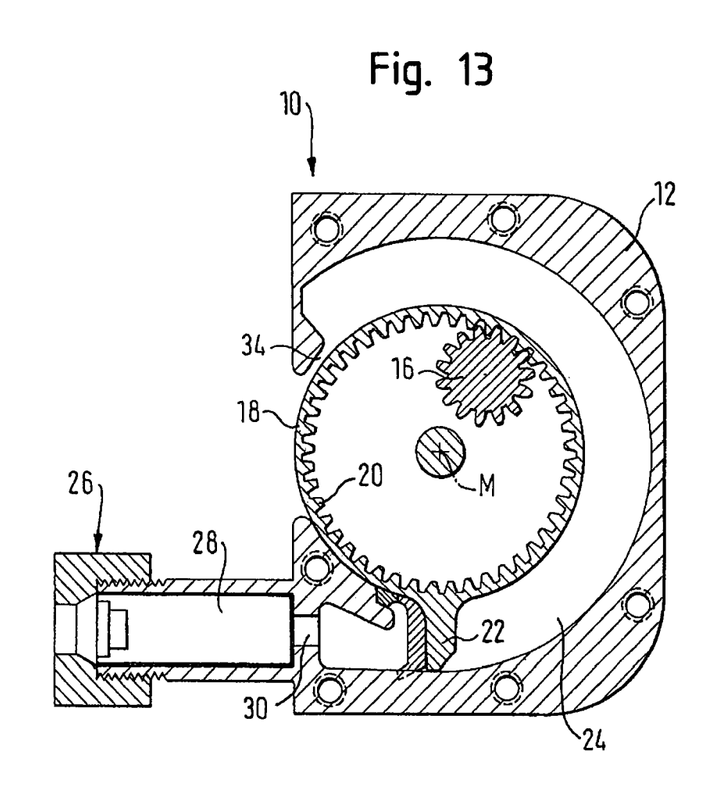
FIG. 13 shows a sectional view of a belt tensioner according to a sixth embodiment of the invention in the state of installation.
Figure 14:
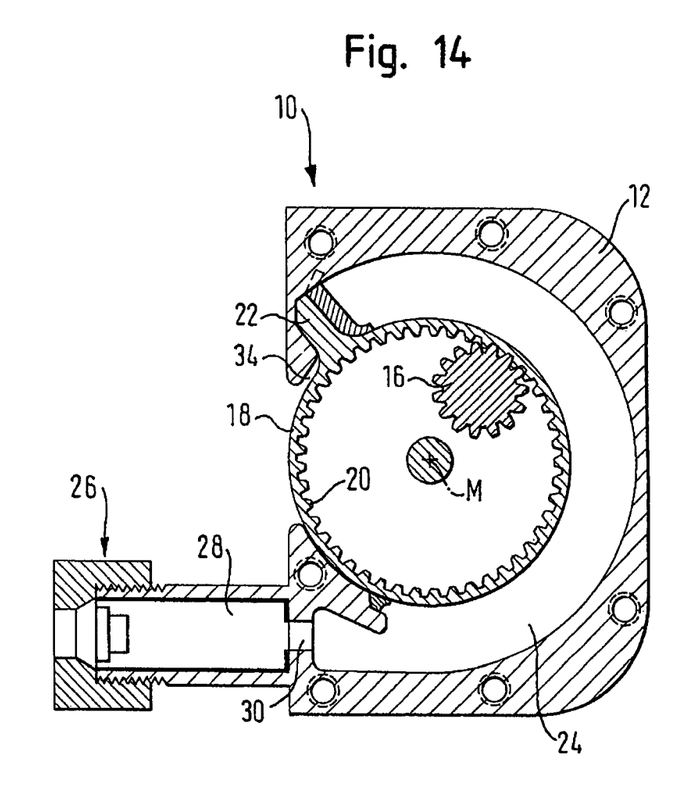
FIG. 14 shows a sectional view of the belt tensioner of FIG. 13 after a tensioning action.

Represented in FIGS. 13 and 14 is a sixth embodiment of the belt tensioner 10 according to the invention which differs from the belt tensioner 10 according to FIGS. 5 and 6 substantially by the toothed rack 18 having the shape of a full circle instead of a quarter circular arc. On account of the larger arc length of the partially ring-shaped recess 24 for the engagement element 22 (in this arrangement about ⅝ of the full circle) the belt tensioner 10 according to FIGS. 13 and 14 moreover has a higher tensioning efficiency.

Figure 2:
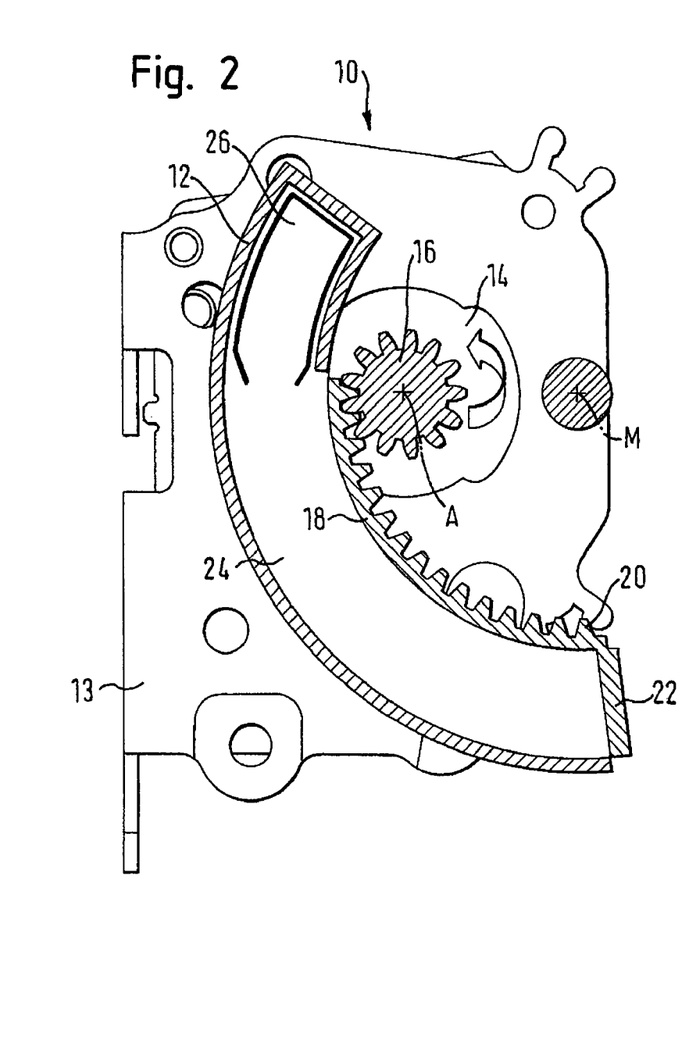
FIG. 2 shows a sectional view of the belt tensioner of FIG. 1 after the activation of the belt tensioner.
Figure 15:
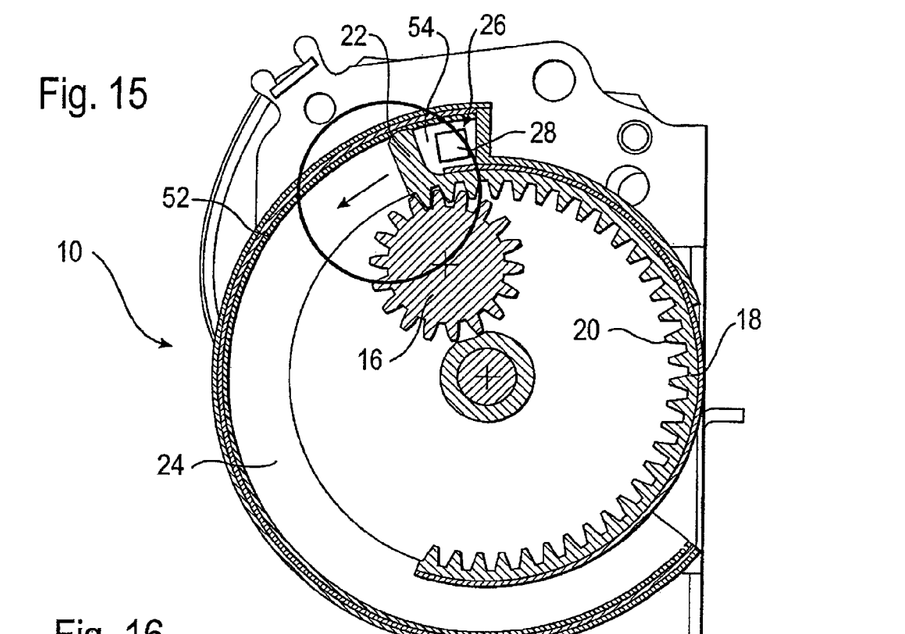
FIG. 15 shows a sectional view of a belt tensioner according to a seventh embodiment of the invention in the state of installation.
Figure 16:
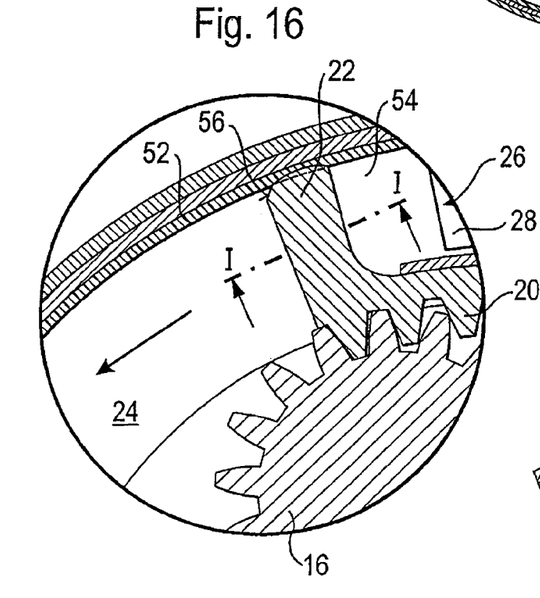
FIG. 16 shows an enlarged detail representation of the belt tensioner of FIG. 15.
Figure 17:
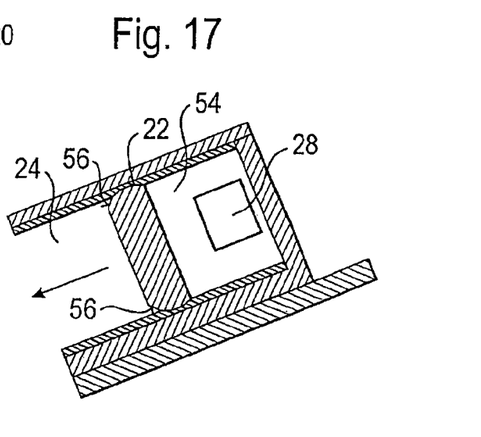
FIG. 17 shows a detailed sectional view along the line I-I in FIG. 16.

FIGS. 15 to 17 show a seventh embodiment of a belt tensioner 10 in accordance with the invention which is similar to the belt tensioner 10 according to FIGS. 1 and 2. In the belt tensioner 10 according to FIGS. 15 to 17, however, the recess 24, which in the example shown has a rectangular cross-section, includes a coating 52. Achieved by means of the coating 52 is a sealing arrangement of the section of the recess 24 which is configured as a pressure chamber 54 and which, relative to the engagement element 22, is situated on the side of the drive unit 26, here in particular of the pyrotechnical drive 28.

As is apparent in FIGS. 16 and 17, the engagement element 22 includes on its three free sides (i.e. those not connected to the toothed rack 18) one chamfered edge 56 each which is disposed on the side of the engagement element facing away from the drive unit 26. The chamfered edges 56 facilitate a penetration of the engagement element 22 into the coating 52, whereby the sealing effect is increased. During the tensioning movement in which the engagement element 22 moves along the recess 24, the coating 52 is, so to speak, pressed or kneaded, and thus the desired sealing function is obtained. An additional sealing attached to the engagement element 22 is not necessary. Moreover, by means of the coating 52 tolerances of the individual components on each other may be compensated. At the same time the coating 52 constitutes a particularly low-wear sealing arrangement, since in every position of the toothed rack 18 another section of the coating 52 is stressed by the engagement element 22.

Figure 18:
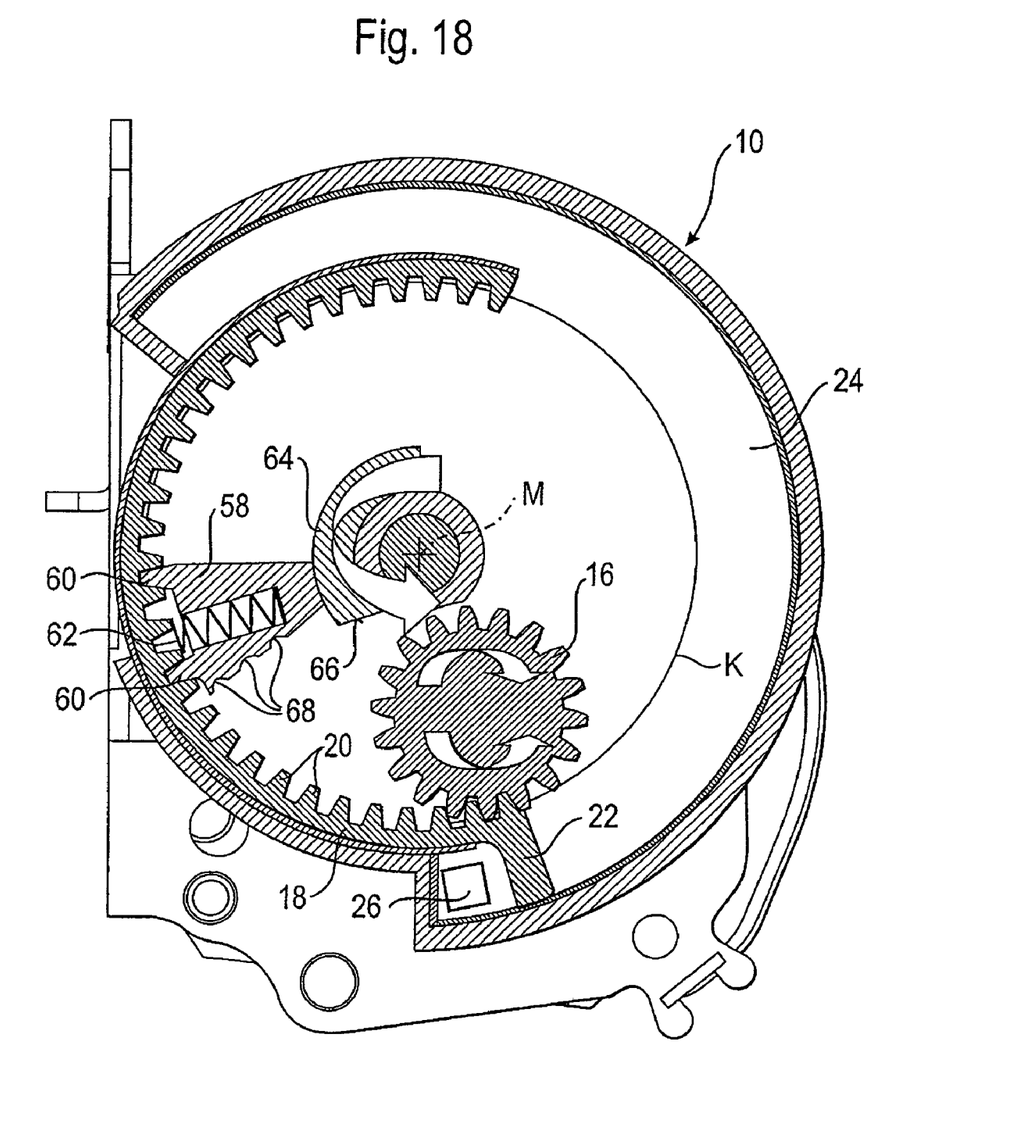
FIG. 18 shows a sectional view of a belt tensioner according to an eighth embodiment of the invention in the state of installation.

FIG. 18 shows a belt tensioner 10 according to an eighth embodiment of the invention. This belt tensioner 10, too, is constructed substantially similarly to the belt tensioner of FIGS. 1 and 2, but additionally includes a locking wedge 58 which is disposed within the circular path K. In section, the locking wedge 58 is configured approximately in the shape of a truncated cone and includes two teeth 60 which are engaged with the toothing 20 of the toothed rack 18 in the state of installation shown in FIG. 18. By means of the teeth 60 the locking wedge 58 is releasably coupled to the toothed rack 18 at the start of the tensioning movement.

The locking wedge 58 further includes a prestressed spring 62 which supports on the toothed rack 18, in particular on the toothing 20 thereof. By means of the spring 62 the locking wedge is urged against a housing-fixed guide 64 which extends approximately in the shape of a circular ring about the central point M of the circular path K. The guide 64 includes an edge 66 on its side facing the pinion. A plurality of recesses 68 is provided on the side of the locking wedge 58 facing the pinion 16.

When the drive unit 26 is activated, the toothed rack 18 moves on the circular path K counterclockwise and thereby likewise drives the pinion 16 counterclockwise. By means of the teeth 60 engaging in the toothing 20 of the toothed rack 18, the locking wedge 58 is moved along the guide 64 towards the pinion 16 until it has passed the edge 66 of the guide 64. As soon as this has happened, the locking wedge 58 is pressed towards the central point M of the circular path K on account of the prestress of the spring 62 and the now absent support by the guide 64, with the teeth 60 being moved out of engagement with the toothing 20. At this point in time the locking wedge 58 has already assumed a position in which the pinion 16 is engaged with the recesses 68. The recesses 68 are configured asymmetrically such that in the tensioning direction of the pinion 16, hence counterclockwise, a repelling moment is exerted on the locking wedge 58, so that the latter does not obstruct the rotation of the pinion 16 in the tensioning direction. Hence, the teeth of the pinion 16 are able to slip over the recesses 68 in this direction.

When the pinion 16 now, after termination of the tensioning movement, starts to rotate clockwise as a result of the vehicle occupant falling into the belt, this leads to a retracting moment for the locking wedge 58 on account of the fashioning of the recesses 68, the retracting moment immediately blocking a clockwise rotation of the pinion 16. Namely, because of the fashioning of the recesses 68 the toothing of the pinion 16 clockwise entrains the locking wedge upwards, where it comes up against the housing-fixed guide 64 and becomes wedged. On account of the immediate locking of the belt retractor shaft after termination of the tensioning action a shoulder force drop in the belt webbing is considerably reduced, and the dynamic locking side stress of the locking system is also significantly lowered.

Figure 19:
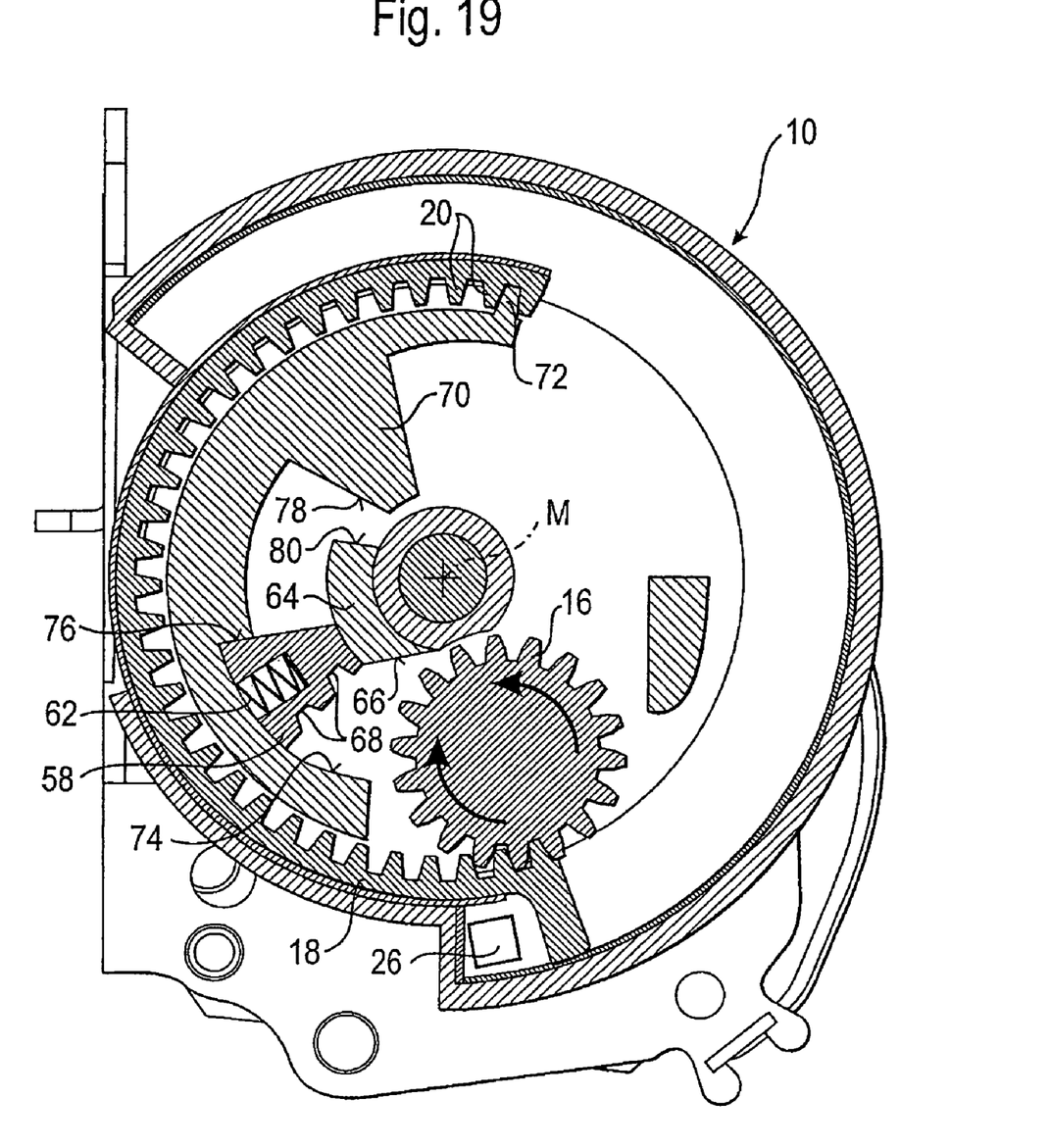
FIG. 19 shows a sectional view of a belt tensioner according to a ninth embodiment of the invention in the state of installation.

FIG. 19 shows a belt tensioner 10 according to a ninth embodiment of the invention, with only the differences to the belt tensioner according to FIG. 18 being discussed hereinafter. In the embodiment according to FIG. 19, the locking wedge 58 is not directly engaged with the toothed rack 18, but there is provided an intermediate member 70 which in the state of installation engages with the toothing 20 of the toothed rack via one tooth 72. The locking wedge 58 supports on a supporting surface 74 of the intermediate member 70 via the spring 62, the supporting surface 74 being bent in the shape of a partial circle.

When the drive unit 26 is activated, the toothed rack 18 moves counterclockwise and also drives the pinion 16 counterclockwise. Because of the coupling of the intermediate member 70 to the toothed rack 18, the intermediate member is likewise moved counterclockwise and entrains the locking wedge 58 towards the pinion 16 via an edge 76. After a certain rotation the locking wedge 58 again passes the edge 66 of the guide 64, its recesses 68 thereby coming into engagement with the pinion 16.

Approximately at the same time or shortly after the locking wedge 58 has reached its locking position, a further radially extending edge 78 of the intermediate member 70 abuts against an edge 80 of the guide, which is opposite to the edge 66, and is prevented in this manner from moving further. Since the toothed rack 18 continues to move counterclockwise, the tooth 72 is shorn off.

The recesses 68 are again configured such that upon a rotation of the pinion 16 in the tensioning direction (counterclockwise), a repelling moment is exerted on the locking wedge 58 and urges the latter towards the supporting surface 74, whilst with an (attempted) clockwise rotation of the pinion 16 a retracting moment on the locking wedge 58 materializes, which provides for a blocking of the pinion 16 in the unwinding direction of the belt webbing.

Figure 20:
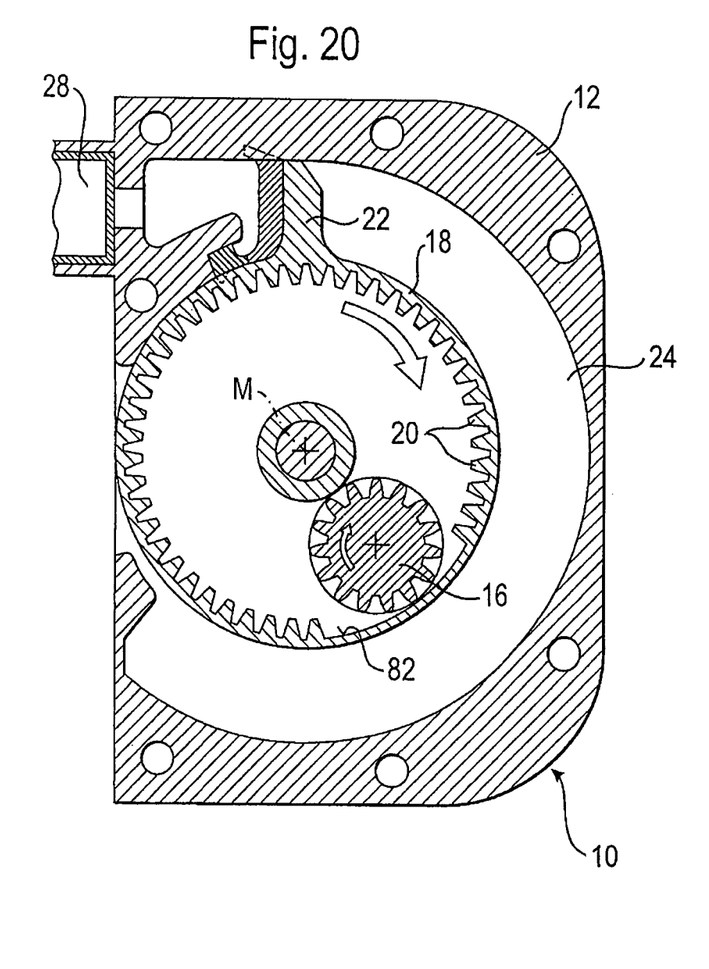
FIG. 20 shows a sectional view of a belt tensioner according to a tenth embodiment of the invention in the state of installation.
Figure 21:
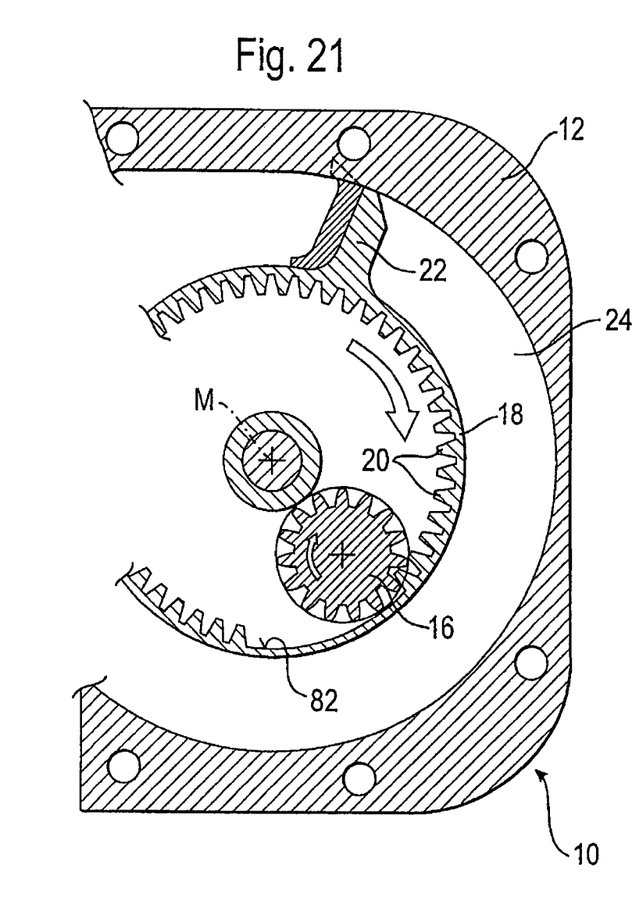
FIG. 21 shows a sectional view of the belt tensioner of FIG. 20 immediately after the start of a tensioning action.

Represented in FIGS. 20 and 21 is a tenth embodiment of the belt tensioner 10 in accordance with the invention, which is very similar to the belt tensioner of FIGS. 13 and 14. The toothed rack 18 in the belt tensioner 10 of FIGS. 20 and 21, however, includes a section 82 in which the toothing 20 was omitted. Prior to the activation of the belt tensioner (see FIG.

20) this section 82 without toothing is disposed in the region of the pinion 16 so that the latter is able to freely rotate with the belt retractor shaft during the normal retraction operation. Thereby, a mechanical coupling between the belt retractor shaft and the pinion 16 may be dispensed with. When the belt tensioner 10 is activated, the toothed rack 18 rotates, clockwise in this arrangement, whereby after a certain angle of rotation the toothing 20 of the toothed rack 18 comes into engagement with the toothing of the pinion 16 (see FIG. 21), and a torque is transmitted from the toothed rack 18 to the pinion 16.

Figure 22:
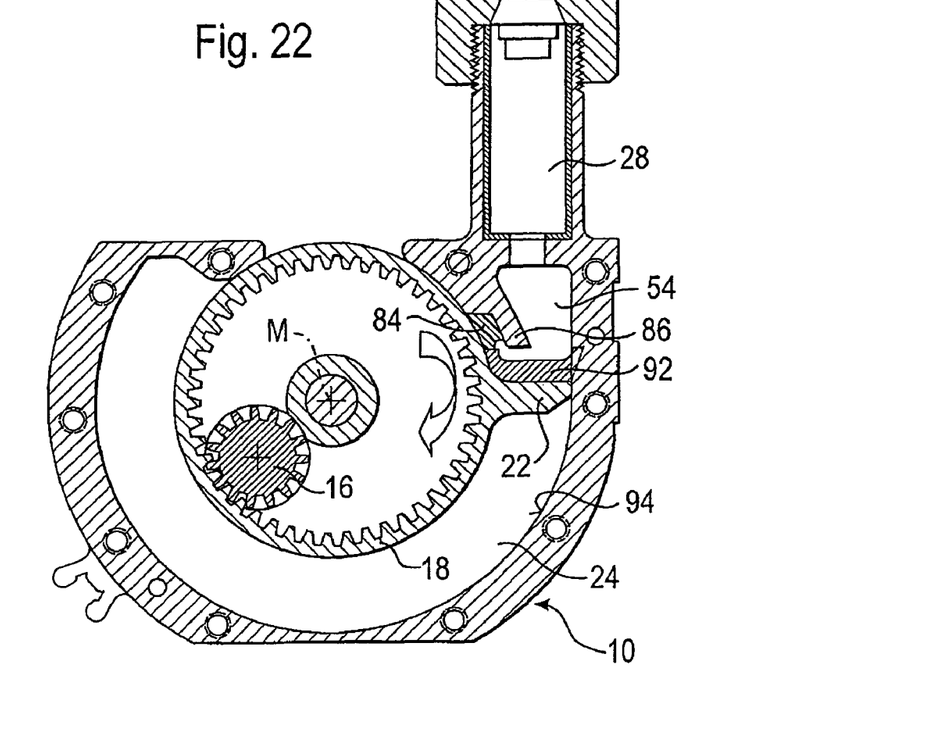
FIG. 22 shows a sectional view of a belt tensioner according to an eleventh embodiment of the invention in the state of installation.
Figure 23:
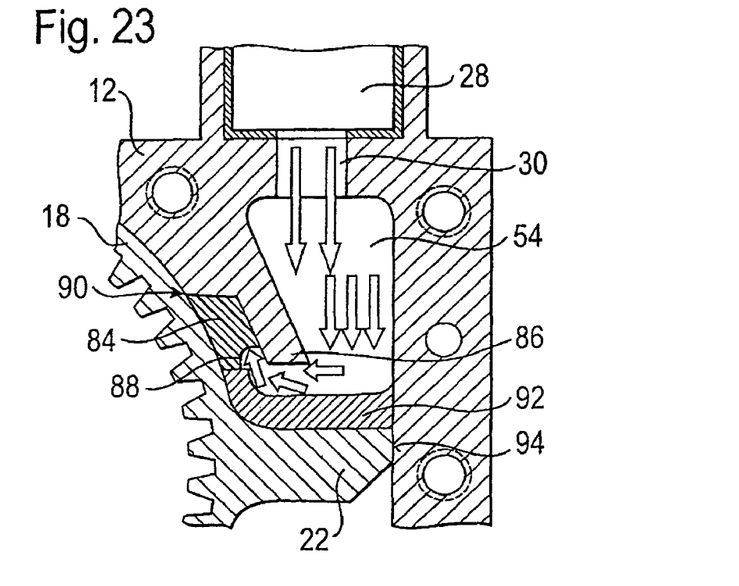
FIG. 23 shows an enlarged detail representation of the belt tensioner of FIG. 22.

FIGS. 22 and 23 show an eleventh embodiment of a belt tensioner 10 according to the invention, which is likewise similar to the belt tensioner 10 according to FIGS. 13 and 14. In the belt tensioner of FIGS. 22 and 23 the toothed rack 18 could, however, likewise be configured as a partial circular arc. The belt tensioner 10 includes a sealing 84 which is disposed between the toothed rack 18 and a protrusion 86 of the housing 12.

When the pyrotechnical drive 28 is activated, a gas pressure is produced in the pressure chamber 54 (as indicated in FIG. 23 by the arrows) and presses the sealing 84 against the rotating toothed rack 18. For this purpose the sealing 84 is provided with an arched engagement surface 88 for the gas pressure, which is just diagonally opposite to the gap 90 to be sealed between the toothed rack 18 and the housing 12. In addition, the protrusion 86 provides for a systematic guiding of the gas pressure onto the engagement surface 88.

By means of this geometrical design, upon an application of pressure on the engagement surface 88, the sealing 84 is moved straight towards the gap 90, whereby the latter is optimally sealed. In the process, the sealing effect of the sealing 84 increases as the gas pressure rises. Moreover, the sealing 84 is securely embedded between the protrusion 86 and the toothed rack 18. A further sealing 92 attached to the engagement element 22 provides for a sealing of the pressure chamber 54 between the moving engagement element 22 and the wall 94 of the housing 12.

All of the embodiments of the belt tensioner 10 in accordance with the invention are distinguished by a compact construction and simultaneously a high tensioning efficiency. By differently selecting the toothed rack 18 and the pinion 16, in particular with respect to the number of teeth and the reference circle diameter, different tensioning efficiencies may be attained. On account of the lever effect (cf. FIG. 4), a high tensioning efficiency may also be achieved by a comparatively low drive energy. Simultaneously, the component stress is reduced. On account of the few components the system is very cost-effective and may also be implemented without a coupling if the toothed rack 18 is configured according to FIGS. 20 and 21, or else, in the case of a configuration as a partial circular arc, is not engaged with the pinion 16 prior to the activation of the belt tensioner 10 and after the tensioning action, but only comes into engagement with the pinion 16 for the tensioning period. In that case, the pinion 16 may be permanently coupled to the shaft of the belt retractor.

Of course, it is at the discretion of those skilled in the art to use all of the features described individual or in combination with each other, in order to solve the problem in accordance with the invention.

The invention claimed is:

1. A belt tensioner for a safety belt system, comprising:
a pinion (16) rotatably mounted in a housing (12), a drive unit (26), and
a toothed rack (18) whose toothing (20) is directly engaged or comes into direct engagement with the pinion (16) and which can be driven by means of the drive unit (26), the toothed rack (18) having the shape of a circular arc with toothing (20) being located at a radially inner side of the circular arc and, upon activation of the drive unit (26), moving on a circular path (K) the central point (M) of which is offset from the axis of rotation (A) of the pinion (16),
the toothed rack (18) includes an engagement element (22) for the drive unit (26), the engagement element (22) having a larger radial distance from the central point (M) of the circular path (K) than the toothing (20).

2. The belt tensioner according to claim 1, wherein there is provided a rotary vane (32) via which the toothed rack (18) is rotatably mounted on the housing (12) in the central point (M) of the circular path (K).

3. The belt tensioner according to claim 1, wherein the drive unit (26) comprises a pyrotechnical drive (28).

4. The belt tensioner according to claim 1, wherein the engagement element (22) is configured as a pressure surface and is disposed in a pressure chamber which surrounds the circular path (K) at least partly.

5. The belt tensioner according to claim 1, wherein the drive unit (26) includes a force transmission element which is non-positively or directly coupled to the engagement element (22).

6. The belt tensioner according to claim 5, wherein the force transmission element is integrally formed with the engagement element (22).

7. The belt tensioner according to claim 5, wherein the force transmission element is a tubular sleeve (36).

8. The belt tensioner according to claim 5, wherein the force transmission element is a piston (40).

9. The belt tensioner according to claim 5, wherein the force transmission element comprises a plurality of balls (50).

10. The belt tensioner according to claim 4, wherein the pressure chamber (54) includes a coating (52) which serves as a sealing arrangement.

11. The belt tensioner according to claim 10, wherein the engagement element (22) partly penetrates into the coating (52).

12. The belt tensioner according to claim 11, wherein the engagement element (22) includes at least one chamfered edge (56) on the side facing away from the drive unit (26).

13. The belt tensioner according to claim 1, wherein there is provided a locking wedge (58) which comes into engagement with the pinion (16) upon activation of the drive unit (26) and subsequently prevents a rotation of the same against the tensioning direction.

14. The belt tensioner according to claim 13, wherein at the start of the tensioning movement the locking wedge (58) is releasably coupled to the toothed rack (18).

15. The belt tensioner according to claim 13, wherein at the start of the tensioning movement the locking wedge (58) is guided along a housing-fixed guide (64).

16. The belt tensioner according to claim 13, wherein the locking wedge (58) includes at least one tooth (60) which engages with the toothing (20) of the toothed rack (18) at the start of the tensioning movement.

17. The belt tensioner according to claim 16, wherein the locking wedge (58) includes a prestressed spring (62) which supports on the toothed rack (18).

18. The belt tensioner according to claim 13, wherein at the start of the tensioning movement the locking wedge (58) is coupled to the toothed rack (18) via an intermediate member (70).

19. The belt tensioner according to claim 18, wherein the locking wedge (58) includes a prestressed spring (62) which supports on the intermediate member (70).

20. The belt tensioner according to claim 1, wherein the toothed rack (18) includes a section (82) without toothing which is disposed in the region of the pinion (16) prior to the activation of the drive unit (26).

21. The belt tensioner according to claim 4, wherein for sealing the pressure chamber (54) a sealing (84) whose sealing effect increases as the pressure rises is disposed between the toothed rack (18) and the housing (12).

22. The belt tensioner according to claim 21, wherein the sealing (84) includes an engagement surface (88) for the gas pressure, which is opposite to a gap (90) to be sealed.

23. The belt tensioner according to claim 21, wherein the housing (12) includes a protrusion (86) by which the sealing (84) is held.

* * * * *